March 30, 1954  J. S. SWEARINGEN  2,673,752
SEAL FORMING MECHANISM
Filed Oct. 1, 1949  3 Sheets-Sheet 1

Judson S. Swearingen
INVENTOR

BY Browning & Simms

ATTORNEYS

March 30, 1954 J. S. SWEARINGEN 2,673,752
SEAL FORMING MECHANISM
Filed Oct. 1, 1949 3 Sheets-Sheet 2

Judson S. Swearingen
INVENTOR

BY
ATTORNEYS

March 30, 1954   J. S. SWEARINGEN   2,673,752
SEAL FORMING MECHANISM
Filed Oct. 1, 1949   3 Sheets-Sheet 3

Judson S. Swearingen
INVENTOR

BY Browning & Simms

ATTORNEYS

Patented Mar. 30, 1954

2,673,752

UNITED STATES PATENT OFFICE 2,673,752

SEAL FORMING MECHANISM

Judson S. Swearingen, San Antonio, Tex.

Application October 1, 1949, Serial No. 119,131

4 Claims. (Cl. 286—9)

This invention relates in general to a seal forming mechanism and has for its object the provision of such a mechanism which will provide a nearly perfect seal from the standpoint of sealing against leakage, and in which there will be very little friction involved and no actual contact of the solid mechanical sealing parts which move relative to each other.

This invention has particular application to the situation in which it is desired to form a seal between two parts which move with extreme rapidity with respect to each other, and in which the presence of a very slight leakage will not be objectionable but in which the relative speeds are such that the presence of any mechanical contact between the moving parts would be extremely objectionable from the standpoint of rapid deterioration of the parts and also from the standpoint of interference with processes being carried on in connection with the apparatus.

The particular apparatus which is illustrated in the drawings as one application to which this invention is peculiarly adapted, is that of providing a seal against the rotor of an expansion turbine used in the expansion of gases, in which the turbine rotor is designed to revolve at extremely high speeds of the order of 30,000 R. P. M. It is the primary object of this invention to provide such a sealing mechanism which will, under the indicated conditions of operation, provide a very nearly perfect seal, but a seal in which there will be during operation no actual rubbing together of the mechanical parts of the mechanism.

Another object is to provide a seal of the type described which does not depend on rotation for its operation. Its operating clearance may be maintained at all speeds including standing.

Still another object is a frictionless seal which self-adjusts its operating clearance to a predetermined optimum whether its non-operating position be with the opposed seal surfaces in contact or with a clearance somewhat greater than such optimum.

Other objects and advantages of this invention will become apparent from the following description taken in connection with the accompanying drawings wherein are illustrated by way of example two embodiments of this invention.

Figure 1:
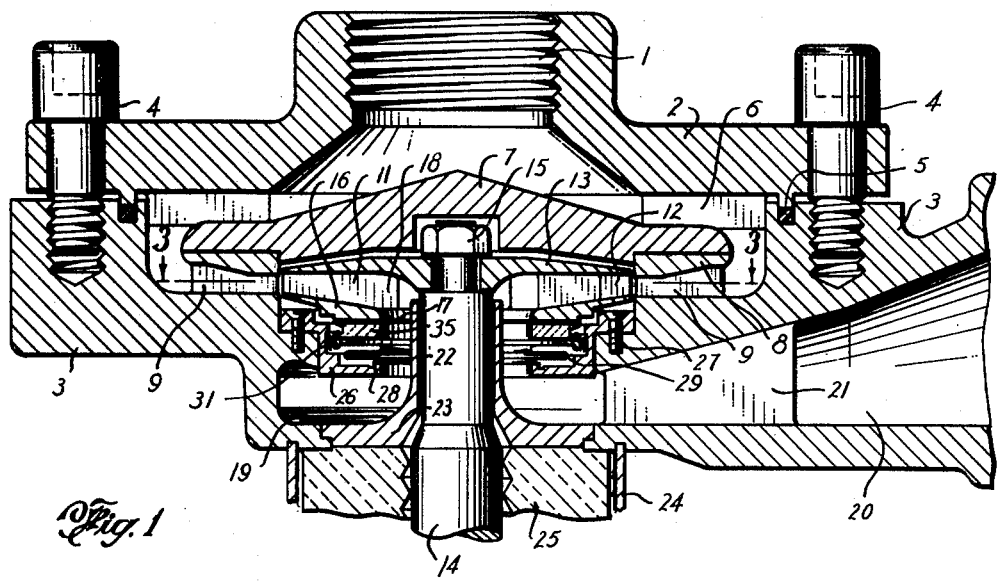
Figure 1 illustrates on an enlarged scale a longitudinal cross section through a gas expansion turbine employing a seal constructed in accordance with this invention.
Figure 2:
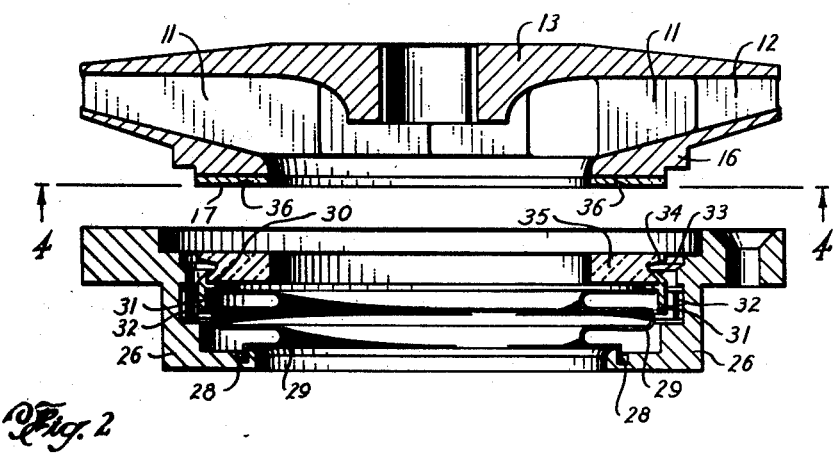
Figure 2 is a view on a still further enlarged scale illustrating the rotor and sealing mechanism forming a part of the structure illustrated in Figure 1.
Figure 5:
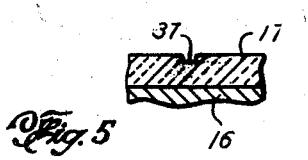
Figure 5 is a fragmentary cross section on a greatly enlarged scale taken along the line 5—5 of Figure 4 and showing one feature of that portion of the sealing mechanism carried by the rotor.

Referring now more in detail to the drawings, the turbine is illustrated as having an inlet 1 through a cover plate 2 which is secured to the main turbine housing member 3 by means of bolts 4 and is sealed to the housing member by any suitable sealing arrangement 5.

The cover member 2 is provided on its inner surface with a series of vanes 6 which are disposed substantially radially and which extend toward the interior of the turbine housing and into contact with the stationary deflector or cap 7, which in turn bears against and holds in place the ring 8 carrying the stationary vanes 9 of the turbine.

Figure 3:
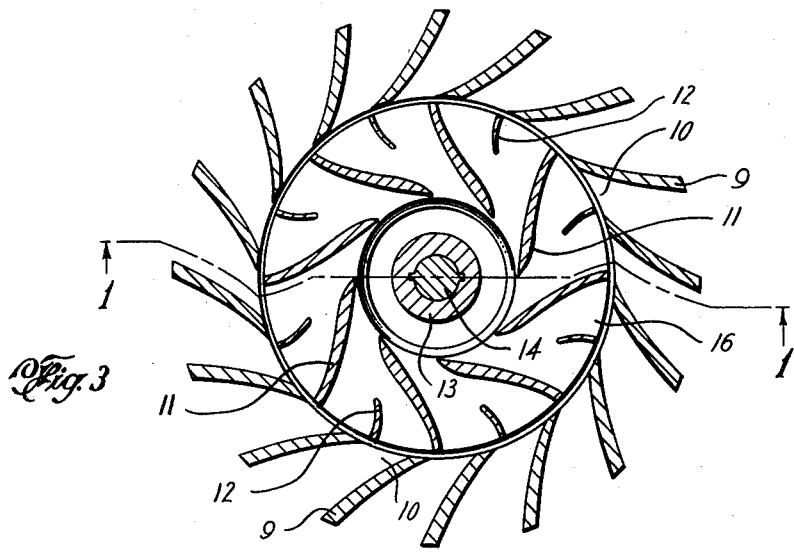
Figure 3 is a view taken along the line 3—3 of Figure 1 and showing the arrangement of the stationary and rotating vanes forming a part of the expansion turbine.

By reference to Figure 3 it will be seen that the stationary vanes 9 are so disposed as to form a series of nozzles 10 which are directed almost tangentially with respect to the outer periphery of the rotor. Thus, the vanes 9 are intended to provide a series of jets of gas against the rotor vanes 11 and 12. These rotor vanes 11 and 12 are carried by the rotor proper which is designated as 13 and is mounted upon the upper end of a shaft 14, being held in place thereon by means of a nut 15 or other suitable holdfast apparatus. The rotating vanes 11 extend between the rotor body 13 and a solid ring 16 spaced from the rotor body 13 by the width of the vanes and secured to the vanes so as to form an integral part of the rotor. This rotor has the ring 16 provided with a radial face having a hard surfacing bearing material 17 disposed thereon, this hard surfacing material forming a part of the sealing mechanism presently to be more fully described.

The expanding gases upon emerging from between the rotor vanes 11 and 12 as the gases travel inwardly between the parts 13 and 16 of the rotor, expand into the annular space 18 adjacent the hub of the rotor and travel thence axially along that annular space into the collector space 19. The gas thus expanded and collected passes out through the turbine outlet 20, which for structural purposes is provided with an intermediate web 21 as illustrated in Figure 1.

The shaft 14 extends downwardly through a sleeve 22 which embraces the shaft but without any tight frictional engagement. This sleeve is carried on a plate 23 which is in turn fitted in to the opening in the lower portion of the turbine housing 3 and provides a closure between the opening in the turbine housing and the shaft 14.

Extending away from the lower surface of the turbine housing and surrounding the shaft 14 is a sleeve-like support 24 which serves to support a driven energy absorption and seal arrangement from the turbine housing, while conducting very little heat away from or toward the turbine, and within this sleeve is disposed a block of insulation 25, likewise adapted to retard the conduct of heat toward or away from the turbine.

For the purpose of providing the necessary seal between the body 3 of the turbine and the rotor ring 16, so as to prevent the by-passing of the rotor blades by the expanding gas, there is provided a bracket 26 of annular formation having a part secured to the turbine housing 3 by means of screws 27 or the like. This annular bracket 26 has a radially inwardly extending part provided with means 28 forming a sealed connection with the lower end of a bellows, preferably of the metallic type, 29.

The opposite end of the bellows 29 is secured at 30 to a suitable annular attaching or adaptor member 31 having a cylindrical skirt the lower edge of which acts as a stop to contact bracket 26 and limit compression of the bellows. The outer face of this skirt is adapted to be contacted by the corrugated flat spring member 32. This spring member 32 serves to introduce axial friction against the adaptor member 31 to prevent chattering of the bracket during operation. Suitable additional dampening means may also be provided for preventing vibration of the bellows 29 if that be found necessary.

The annular guide member and bracket 31 is also provided with an overhanging lip 33 adapted to be rolled or pressed into a groove 34 in a ring of suitable sealing material preferably of carbon as indicated at 35. Thus the carbon sealing ring 35 has a face which is movable directly toward or away from the sealing facing 17 on the rotor.

Figure 4:
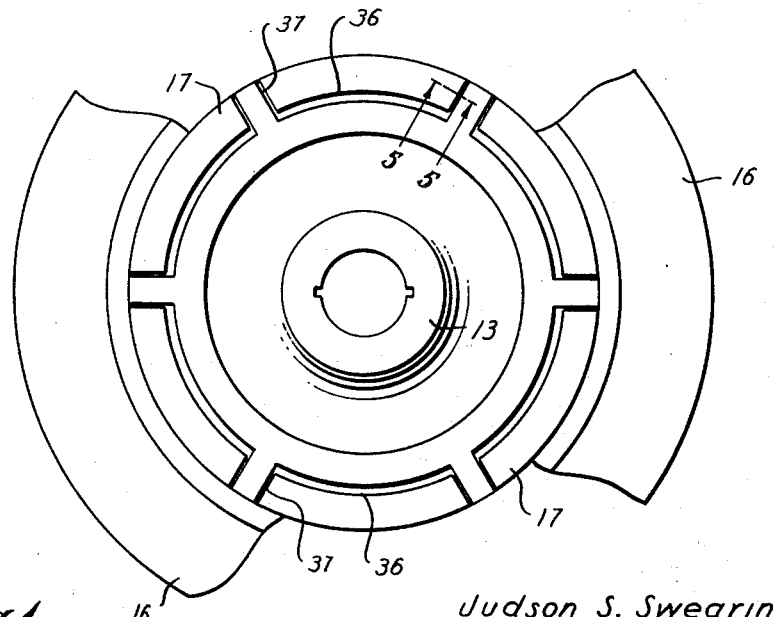
Figure 4 is a view taken along the line 4—4 of Figure 2 and illustrating that portion of the sealing mechanism which is carried on one face of the rotor.

Referring now to Figure 4 illustrating in elevation the face of the sealing surface 17 of the rotor, it will be seen that this face is provided with circumferentially extending grooves interrupted at regular intervals throughout the circumference of the sealing face, each segment of such groove 36 being connected by means of an additional substantially radial groove 37 with the high pressure edge of the sealing surface.

It may be explained that the exact arrangement of grooves illustrated in Figure 4 is not essential but that it is essential that the circumferentially extending groove be interrupted at one or more points for reasons hereinafter to be more fully explained, and that each segmental portion of the circumferential groove be connected to the high pressure edge of the sealing surface by means of an additional radially extending groove.

It should be explained at this point that the drawings illustrating this invention are on a much larger than full size scale in order that they might be more illustrative of the invention and more easily read, and that in actual practice the size of the rotor, for example, might be of the order of 3 inches, with the outside diameter of the sealing surface approximately 2 inches and the inside diameter thereof approximately $1\frac{2}{10}$ inches, the diameter of the circle formed by the circumferential groove being of the order of $1\frac{1}{2}$ inches. For these dimensions, and for a machine adapted for the purpose of expanding compressed air as in the making of liquid air, the width of the circumferential groves would be of the order of .020 inch to .030 inch, and the widths of the grooves 37 would be of the order of .011 inch to .017 inch, while the depths of these grooves 37 would be of the order of 0.006 inch to 0.009 inch. Thus, it will be seen that the groves are of very small size indeed and are of such size any substantial flow therethrough would create a very great pressure drop along the length of a groove.

Figure 6:
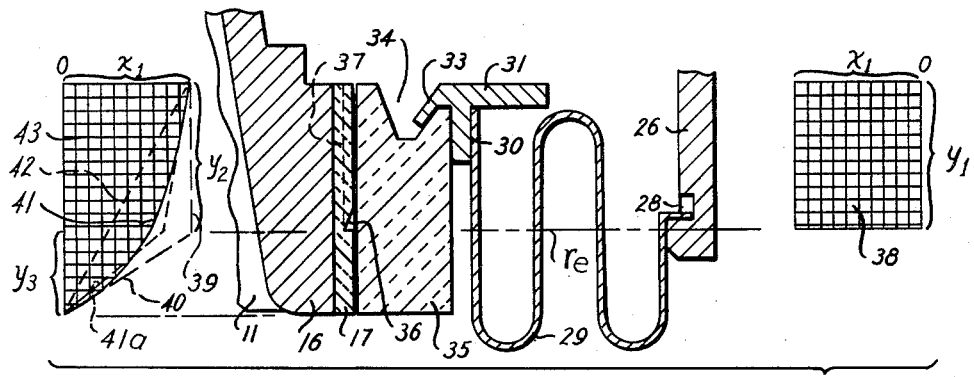
Figure 6 is a view on a very large scale showing in cross section the contacting parts of the sealing mechanism and showing in connection therewith a graphical illustration of the pressure forces acting upon these parts due to the pressure being sealed against.
Figure 8:
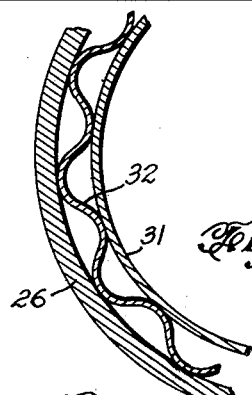
Figure 8 is a fragmental cross-section illustrating the disposition of a means for preventing chattering and vibration of the sealing mechanism carried by the housing.

Referring now to Figure 6 of the drawing, particularly to the graphical illustration of the pressures acting upon the carbon ring 35, the graphical representation to the right of this figure indicates by the dimension $x_1$ the pressure per unit area on the high pressure side of the seal with respect to the pressure on the low pressure side of the seal as a zero reference. This pressure would act upon the right hand side of the carbon ring 35 as seen in Figure 6 and would act over an effective width of this ring substantially equal to the distance indicated by the letter $y_1$. $Y_1$ is the radial distance from the outer margin of the seal to the effective radius of the bellows as designated by the line $r_e$. Under these circumstances the total pressure on the right hand side of the carbon seal ring 35 by virtue of the high pressure being sealed against, which total pressure would tend to force this carbon ring against the surface 17 of the rotor, may be represented by the area of the square 38. For reasons of simplicity the approximation of an assumed constant circumference has been used.

On the other side, at the uppermost edge of the seal ring 35 there would exist the same unit pressure tending to force the ring 35 away from the rotor, and if it be considered that an infinitesimal amount of air is permitted to leak between the rotor and the ring 35, this same unit pressure $x_1$ would exist over the entire face of the seal ring 35 down as far as the circumferential groove 36 because of the communication of this pressure to groove 36 by passages 37. This distance is indicated by the letter $y_2$ and is substantially equal to the distance $y_1$.

From the circumferential groove 36 downwardly to the low pressure edge of the ring 35 there would under such circumstances exist a pressure gradient, the pressure dropping as one progresses toward the low pressure edge of the ring, the drop being from the maximum pressure $x_1$ at the groove 36 to the lower or expanded pressure which for purposes of present discussion will be regarded as zero at the low pressure edge of the ring 35. Under these circumstances the portion of the width of the ring subjected to the high pressure tending to force the seal ring 35 away from the rotor will be indicated by the line 39 or the letter $y_2$, while the portion of the width of the ring subjected to the dropping pressure gradient will be indicated by the letter $y_3$. This pressure gradient may be represented by the line 40.

Inasmuch as the square representing the pressure 38 applied to the right hand side of the sealing ring 35 is substantially equal to the pressure represented by that portion of the graph at the left which is within the substantially square area marked off by the letters $x_1$ and $y_2$, and inasmuch as there is in addition, a force acting upon the left hand surface of the ring 35 as represented by the triangular portion of the graph on the left, bounded by the line 40 and the letter $y_3$, it will be seen that the resultant will tend to force the ring 35 toward the right so as to leave an actual space between the rotor and the ring 35.

However, as the ring 35 begins to move toward the right there will be an increasing flow of gas from the circumferential groove 36 toward the low pressure edge of the ring 35, and this will engender a pressure drop between the high pressure edge of the ring 35 and the groove 36, as well as between the groove 36 and the low pressure edge of the ring 35. When this occurs the pressure gradient instead of being represented by the lines 39 and 40 as in the previously supposed initial case, will be represented by a broken line such as the line 41a. The area bounded by this line and representing the total pressure against the ring 35 tending to move it toward the right will be considerably smaller than the area formerly bounded by the pressure gradient lines 39 and 40. Thus, as the ring 35 moves away from the rotor, the total pressure due to the air or other gas acting upon the ring 35 tending to move it away from the rotor becomes less, and a point of equilibrium will be reached at which this area is exactly equal to the area 38 after taking into account any axial loading caused by the bellows or other mounting means. The ultimate position which the line 41 might assume is represented by the straight dotted line 42 which in actual practice would never be attained. The numeral 43 represents the actual area corresponding to the pressure at which the ring 35 will come into equilibrium spaced slightly from the rotor so as to provide no actual mechanical contact with the rotor, yet close enough to the rotor so that the leakage between the two will be very slight. The actual spacing at which equilibrium will be attained is determined by the cross sectional area of the grooves 37. If at the start of the application of the pressure differential $x_1$ the space between the carbon ring and rotor is so great that there is a substantially straight line pressure drop across the opposed faces as represented by the line 42, then the area below the line $x_1$ and above the line 42 would represent the total pressure tending to separate these faces. This area would be less than the area 38 so that the surfaces would be forced together until the pressure gradient line 42 had moved to the right to the position of equilibrium at 41 at which the shaded area 38 would be balanced by the shaded area 43 and the forces tending to separate the opposed surfaces would exactly equal the forces tending to move them together.

The purpose of making the circumferential groove 36 discontinuous is to avoid the possibility of this groove, which is of considerably larger cross section area than the grooves 37, equalizing the pressure gradient circumferentially so that eccentric loadings due to non-uniformity of the bellows on other parts would cause an uneven clearance and may allow rubbing on the more heavily loaded side. The dams in groove 36 prevent this condition and make necessary the local establishment of clearance and equilibrium conditions at all points around the seal.

Another function of the dams is to act as cutters. In the event of excessive wear of the carbon ring a tongue of carbon would otherwise be left and would extend into and tend to fill groove 36 except for the dams which would act as cutters and prevent this.

The groove 36 is of triangular shape sloping radially outward so that centrifugal force will tend to keep it free of a possible accumulation of dust or other solid material.

It is obvious that in general the seal will perform with all or a part of the grooves cut in the face of either the stationary or the rotating member of the seal.

The foregoing explanation is based on certain simplifying assumptions. However, it is noted that the pressure gradient across a simple clearance seal in the case of an incompressible fluid such as a liquid is linear such as is indicated by line 42 or 40 as the case may be. If the fluid is compressible such as a gas, the pressure gradient is a parabola similar to line 41. If the expansion ratio is near unity, the gradient will be represented by an enlarged segment of the straighter portion of the parabola and will approach the case of the incompressible liquid. If the expansion ratio is large, the gradient will be quite curved as shown by broken curve 41. In the case of zero discharge pressure the curve will terminate tangent to a horizontal line. In view of the foregoing it has been found that in designs for use with fluids of high expansion ratios, smaller effective bellows radii should be used, that shown in the drawings approaching a radius one-third the seal width greater than the inside diameter of the seal, whereas in the case of a liquid an effective bellows radius approaching one-half the seal width greater than the inside diameter of the seal would be proper.

Figure 7:
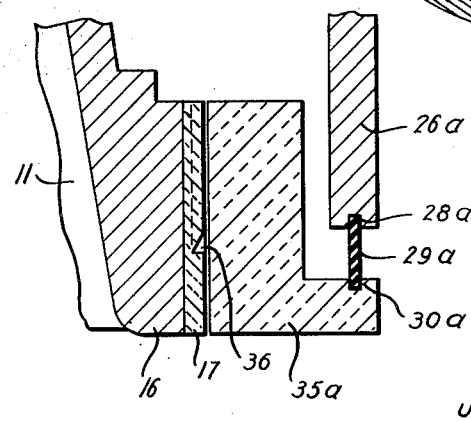
Figure 7 is a view similar to Figure 6 but showing a slight modification of the apparatus and omitting the graphical illustrations included in Figure 6.

Referring now to the modification illustrated in Figure 7, the principle of operation is identical with that which has been described. However, under conditions of reasonable temperature and moderate pressures and where axial space is at a premium, it might be preferable to employ a diaphragm of rubber or the like as illustrated at 29a. This diaphragm could be joined to a bracket 26a at 28a by vulcanizing or any other suitable method, and be similarly joined at 30a to a carbon sealing ring 35a.

The operation and purpose of this last mentioned modification are identical with that previously described except that as mentioned this last modification might be employed under circumstances in which the conditions would possibly interfere with the operation of a metal bellows.

It will be understood that while in the examples given the high pressure sealed against is acting on the outer peripheries of the sealing members and tends to flow inwardly, this invention is not limited as to the direction of such pressure or flow.

In the foregoing, it will be seen that a means has been provided for carrying out and accomplishing all of the objects and advantages sought by this invention, and particularly it has been shown that in the illustrations set forth a substantially complete seal against the passage of gas under pressure between two bodies moving at relatively high speed with respect to each other has been provided, and that in such structure there will be no actual mechanical frictional contact between the parts such as would generate excessive heat that might interfere with the process being carried out, or such as would tend to cause deterioration of the parts.

It will be understood, however, that the embodiments illustrated in the drawings and heretofore described are by way of illustration and example only and are not to be taken by way of limitation of this invention. This invention is limited only by the prior art and by the terms of the appended claims.

The invention having been described, what is claimed is:

1. In a seal of the character described, a pair of seal members having flat sealing surfaces opposed to each other and spaced apart in operation, said sealing surfaces having inner and outer circumferential edges arranged for one to be exposed to a high pressure and the other to a low pressure, one of said members being movable toward and away from the other, said movable member having a portion of its surface remote from the other member effectively exposed to the pressure being sealed against, the effective portion thus exposed being of an area between one-half and two-thirds of the opposed areas of the sealing surfaces, one of said members having its sealing surface formed with an interrupted circumferential groove concentric with and intermediate the low pressure and high pressure edges of said sealing surface, said circumferential groove being narrow relative to the area of the sealing surface of said one member, said sealing surface of said one member also being formed with a narrow restricted groove connecting each isolated portion of said circumferential groove with the high pressure edge of said surface, whereby the pressure differential between said circumferential groove and said high pressure edge is increased as said members move apart so that the net effective force tending to move said members apart decreases with increased spacing apart of the members.

2. In a seal of the character described, a pair of seal members having flat sealing surfaces opposed to each other but spaced apart in operation, said sealing surfaces having inner and outer circumferential edges arranged for one to be exposed to a high pressure and the other to a low pressure, one of said members being rotatable and the other of said members being non-rotatable and movable axially toward and away from the first, one of said sealing surfaces being of a relatively hard metal and the other of a relatively soft material, a stationary housing, a flexible diaphragm providing an axially extensible seal between said axially movable member and said housing, said diaphragm having an effective diameter intermediate diameters of the high and low pressure extremities of the opposed sealing surfaces so that in operation the effect will be that of exposing the surface of the movable seal member which is opposite its seal surface to the pressure being sealed against to the extent of a part of its area which is between one-half and two-thirds of the opposed areas of the sealing surfaces, the sealing surface of relatively hard metal being formed with an interrupted circumferential groove concentric with and intermediate the edges of said sealing surface, said circumferential groove being narrow relative to the area of the hard metal sealing surface, said hard metal sealing surface also being formed with a restricted groove connecting each isolated portion of said circumferential groove with the high pressure edge of said hard metal surface, whereby the pressure differential between said circumferential groove and said high pressure edge is increased as said members move apart so that the net effective force tending to move said members apart decreases with increased spacing apart of the members.

3. In a seal of the character described, a pair of seal members having flat sealing surfaces opposed to each other, but spaced apart in operation, said sealing surfaces having inner and outer circumferential edges arranged for one to be exposed to a high pressure and the other to a low pressure, one of said members being movable toward and away from the other, one of said sealing surfaces being of hard metal and the other being of soft material, said movable member being mounted on a metal bellows, and having a portion of its surface remote from the other member effectively exposed to the pressure being sealed against, the effective portion thus exposed being of an area between one-half and two-thirds that of the opposed areas of the sealing surfaces, the sealing surface of hard metal having formed therein a narrow interrupted circumferential groove concentric with and intermediate the high and low pressure edges of said sealing surface and a restricted groove connecting each isolated portion of said circumferential groove with the high pressure edge of said surface, whereby the pressure differential between said circumferential groove and said high pressure edge is increased as said members move apart so that the net effective force tending to move said members apart decreases with increased spacing apart of the members.

4. In a seal of the character described, a pair of seal members having wide sealing surfaces exposed to each other and spaced apart in operation, said sealing surfaces having inner and outer circumferential edges arranged for one to be exposed to a high pressure and the other to a low pressure, one of said members being movable toward and away from the other, the sealing surface on said movable member being relatively soft and the sealing surface on the other of said members being of relatively hard metal, said movable member having a portion of its surface remote from the other member effectively exposed to the pressure being sealed against, the effective portion thus exposed being of an area between one-half and two-thirds that of the opposed areas of the sealing surfaces, the member having its sealing surface of relatively hard metal being formed with a narrow interrupted circumferential groove concentric with and intermediate the high and low pressure edges of said sealing surface, said circumferential groove having a width of only a fraction of the width of the sealing surface in which it is disposed so that the remaining area of such surface is substantially equal to that of the sealing surface exposed to it, a restricted groove connecting each isolated portion of said circumferential groove with the high pressure edge of said surface, whereby the pressure differential between said circumferential groove and said high pressure edge is increased as said members move apart so that the net effective force tending to move said members apart decreases with increased spacing apart of the members.

JUDSON S. SWEARINGEN.

References Cited in the file of this patent

UNITED STATES PATENTS

| Number | Name | Date |
|---|---|---|
| 811,833 | Emmet | Feb. 6, 1906 |
| 1,822,052 | Maccabee | Sept. 8, 1931 |
| 1,825,251 | Schellens | Sept. 29, 1931 |
| 2,072,656 | Trumpler et al. | Mar. 2, 1937 |
| 2,133,879 | Theare | Oct. 18, 1938 |